(No Model.)　　　　　　　　A. K. WATT.　　　　2 Sheets—Sheet 1.
THRUST BEARING.

No. 503,260.　　　　　　　　　　　Patented Aug. 15, 1893.

Witnesses:
D. W. Gardner
Eugene V. Myers

Inventor:
Arthur K. Watt
By his Attorney
Ernest Webb (No Model.)  
A. K. WATT.  
THRUST BEARING.  
No. 503,260.   Patented Aug. 15, 1893.
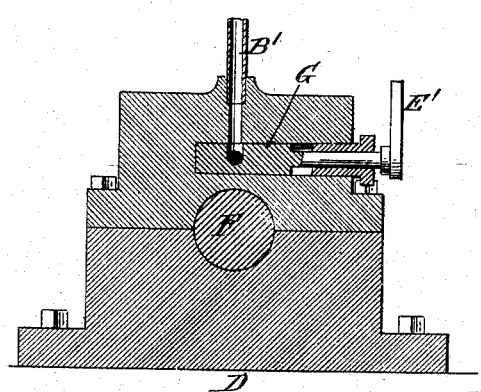
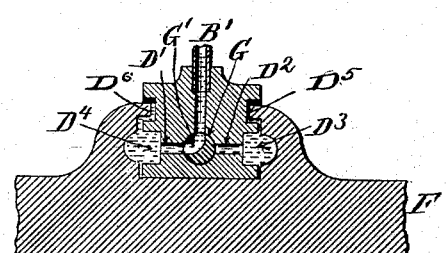
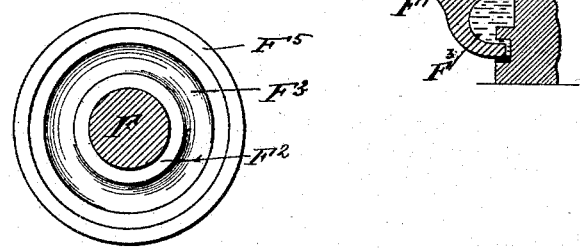
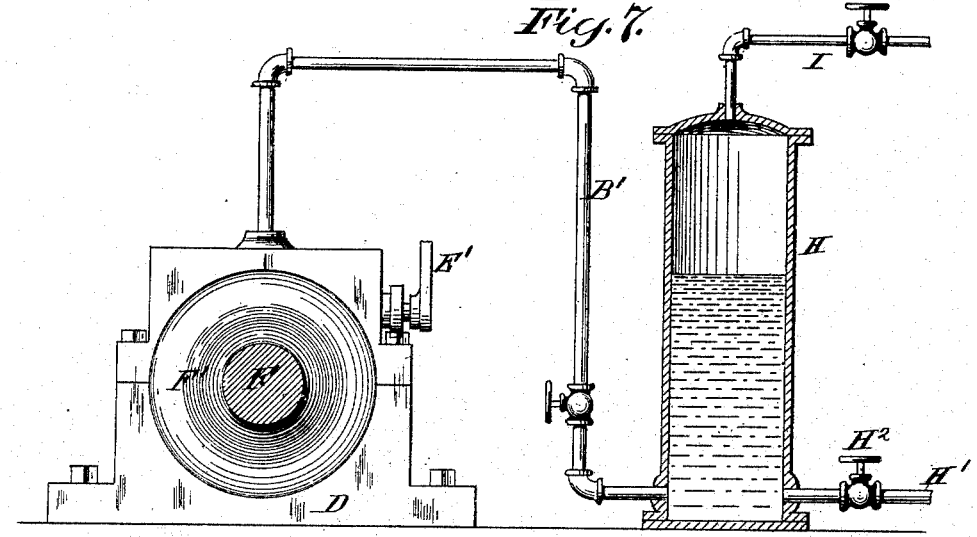
Witnesses:
D. W. Gardner
Eugene V. Myers
Inventor.
Arthur K. Watt
By his Attorney
Ernest C. Webb

UNITED STATES PATENT OFFICE.

ARTHUR K. WATT, OF FLATBUSH, NEW YORK.

THRUST-BEARING.

SPECIFICATION forming part of Letters Patent No. 503,260, dated August 15, 1893.

Application filed September 15, 1892. Serial No. 445,930. (No model.)

*To all whom it may concern:*

Be it known that I, ARTHUR K. WATT, a citizen of the United States, and a resident of Flatbush, in the county of Kings and State of New York, have invented certain new and useful Improvements in Thrust-Bearings, of which the following is a specification.

This invention relates to certain new and useful improvements in thrust bearings for steam propeller shafts and other like machinery. It is well known that in this branch of mechanics, when the engine is started and the shaft rotated, its tendency is to thrust backward, and away from the source of power, and, in the case of steam propellers, as the screw revolves and thrusts backward against the water, the thrust is given in an opposite direction, thereby driving the vessel ahead. The force of this forward thrust is tremendous, and as the shaft revolves in its bearings the friction is so great as to endanger heating of the parts.

It is the object of my invention, therefore, to interpose between the shaft and its thrust bearing, a liquid under sufficient pressure to overcome the thrust, thereby furnishing a liquid film between such surfaces, with consequent decrease of friction, and increased efficiency of the machine.

To these ends, therefore, my invention consists in a shaft bearing block, having on its opposite faces, vertical annular grooves; a valve for automatically supplying the liquid to one or the other of said annular grooves, when the engine is started or reversed, and a shaft having shoulders or bearing faces, so formed as to surround the annular grooves in the thrust bearing, and have at all times a film of the liquid between said bearing faces and the thrust block.

Figure 1:
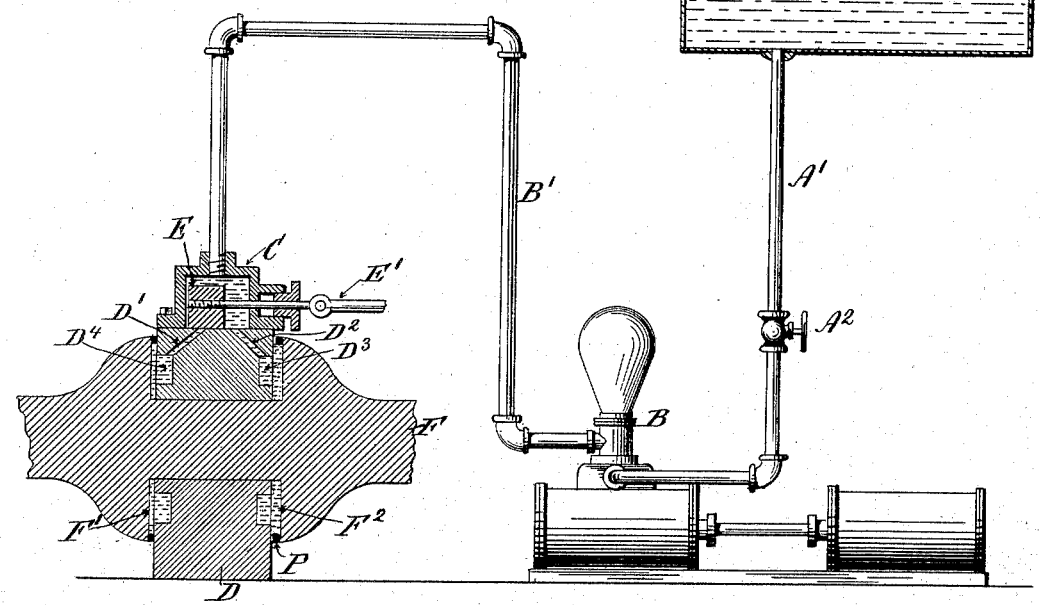
Figure 2:
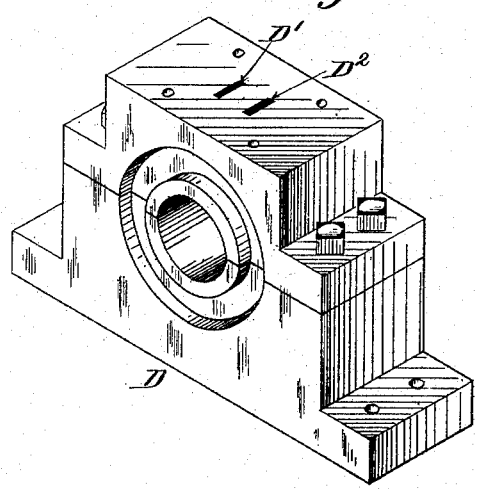

Referring to the accompanying drawings, in the several figures of which like parts are similarly designated, Figure 1, is a sectional elevation, illustrating the use of a pump, in maintaining a pressure of liquid between the thrust bearing and the bearing faces on the shaft. Fig. 2, is an isometrical perspective of the shaft bearing block or thrust bearing. Fig. 3, is a vertical longitudinal section of the same at right angles to the shaft; Fig. 4, a central vertical section at right angles to Fig. 3. Fig. 5, is a fragmentary sectional view of the adjoining faces of the shaft bearing-face, and thrust-bearing, illustrating a modified construction designed to increase the area of the bearing surface of the shaft. Fig. 6, is a transverse section of the shaft, looking toward the inner side of one of the annular shaft shoulders or bearing faces. Fig. 7, is a sectional elevation, illustrating a modified construction, in which liquid is drawn from a liquid reservoir and supplied to the grooves between the shaft bearing-faces.

In Figs. 1 and 2, D, is a shaft bearing block having at each end the annular grooves or channels $D^3$, $D^4$, communicating respectively by the ports $D'$, $D^2$, with the chest C, mounted upon said block. As shown in Fig. 2, the bearing block D, is made in two parts to permit the insertion of the shaft F, which is formed with the two annular shoulders or bearing faces $F'$, $F^2$; the distance between said shoulders being slightly greater than the width of the bearing block and the intervening space on each side being packed with any suitable form of annular packing P.

In operation, water, or other liquid is fed from a reservoir A, or other suitable source, through pipe $A'$ and valve $A^2$, to the pump B, whence said liquid is forced under pressure through pipe $B'$ to chest C, and thence, automatically upon the starting or reversal of the engine, by means of a slide valve E, located in said chest and operated through rod $E'$, connected in the ordinary manner to the engine, through port $D'$, or $D^2$, to one or the other annular groove $D^3$, $D^4$, and between the bearing block and the shoulder on the shaft, which, therefore, revolves upon a liquid film, or upon liquid globules, instead of directly against the bearing block.

As shown in Fig. 2, the block D, is preferably made in two parts to admit of the insertion of the shaft.

In Figs. 3, 4, and 7, a modified arrangement of the inlet valve is shown in the form of a throttle valve G, which is substituted for the slide valve E, shown in Fig. 1; this throttle valve G, is rocked back and forth in unison with the reversal or starting of the engine, by the connecting rod $E'$, or analogous device. The ports $D'$, $D^2$, in this construction pass horizontally through the block from the annular grooves $D^3$, $D^4$, to the central valve-seat of the throttle valve G, which is formed with a quarter turn port G', through which communication is opened alternately between the annular grooves $D^3$, $D^4$, and the supply pipe B', which latter, however, in Fig. 7, extends to the liquid reservoir H, instead of to the pump B. The reservoir H, is supplied with liquid through the pipe H', and valve $H^2$, and is maintained therein under the elastic pressure of air or gas supplied through the pipe I, which communicates with a suitable pump for compressing, or with a reservoir of compressed air or gas.

As shown in Figs. 4, 5 and 6, the shaft bearing block D, is provided at each end with the two concentric annular grooves $D^3$, $D^4$, $D^5$ and $D^6$; the inner grooves $D^3$, $D^4$, being preferably wider than the outer grooves $D^5$, $D^6$, and in this construction, the shaft shoulders or bearing faces F', $F^2$, are provided with the annular grooves $F^3$, to aproximately correspond with the inner grooves $D^3$, $D^4$, of the bearing block, and each shoulder is also provided with the annular peripheral flange $F^4$, $F^5$, which respectively enter and revolve in the outer grooves $D^5$, $D^6$, of said bearing block. Suitable annular packing P, may be employed to prevent excessive leakage, if desired. The construction just described will be found valuable where it is desired to increase the area presented to the interposed lubricant.

It will be apparent that by the use of my improved apparatus, a film of water, oil or other suitable liquid is maintained between the shoulders or bearing-faces of the shaft, and the opposing faces of the shaft bearing block, or thrust bearings, whether the shaft is rotated in one direction or the other, and that by reason of this fact, the friction is greatly diminished, the parts prevented from heating, the strain and wear at this point is much reduced, and the engine rendered more speedy and efficient.

My invention may also be applied to lathes and to other machinery of analogous types.

What I claim as new, and desire to secure by Letters Patent, is—

1. A shaft-bearing block having at each end an annular groove, a shaft passing through said block and having shoulders or bearing faces adapted to surround a portion of said block and cover the grooves therein, and means for automatically forcing liquid under pressure to one or the other of said annular grooves upon the starting or reversal of the engine, substantially as described.

2. A shaft having two shoulders, each of which is provided with an annular groove, and with an inwardly projecting annular flange, in combination with a shaft bearing block located between said shoulders and provided at each end with two concentric annular grooves, the inner grooves corresponding approximately to the grooves in the shoulders, and each outer groove adapted to receive the corresponding flange on said shoulders, and means, substantially as described, for forcing liquid under pressure to the grooves at one end or the other of the bearing block upon the starting or reversal of the engine, for the purposes set forth.

3. A shaft bearing block, a shaft passing through the same and having on each side a shoulder; a packing ring between said shoulders and block on each side, and means for automatically forcing liquid under pressure through ports in said block to one or the other shoulder, upon the starting or reversal of the engine, substantially as described.

Signed at New York, in the county of New York and State of New York, this 2d day of September, A. D. 1892.

ARTHUR K. WATT.

Witnesses:
MIRON WINSLOW,
EUGENE V. MYERS.